US008161493B2

(12) United States Patent
Floyd et al.

(10) Patent No.: US 8,161,493 B2
(45) Date of Patent: Apr. 17, 2012

(54) WEIGHTED-REGION CYCLE ACCOUNTING FOR MULTI-THREADED PROCESSOR CORES

(75) Inventors: Michael S. Floyd, Cedar Park, TX (US); Steven R. Kunkel, Rochester, MN (US); Aaron C. Sawdey, Cannon Falls, MN (US); Philip L. Vitale, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 12/173,771

(22) Filed: Jul. 15, 2008

(65) Prior Publication Data

US 2010/0287561 A1 Nov. 11, 2010

(51) Int. Cl.
G06F 9/45 (2006.01)
G06F 9/46 (2006.01)
(52) U.S. Cl. .................................. 718/108; 703/22
(58) Field of Classification Search ............... 718/108; 703/22
See application file for complete search history.

(56) References Cited

U.S. PATENT DOCUMENTS

| | | | |
|---|---|---|---|
| 5,210,872 A | 5/1993 | Ferguson et al. | |
| 5,530,860 A | 6/1996 | Matsuura | |
| 5,761,091 A | 6/1998 | Agrawal et al. | |
| 5,809,268 A | 9/1998 | Chan | |
| 5,822,602 A | 10/1998 | Thusoo | |
| 5,835,705 A | 11/1998 | Larsen et al. | |
| 5,920,689 A * | 7/1999 | Berry et al. | 714/47.2 |
| 6,092,175 A | 7/2000 | Levy et al. | |
| 6,112,317 A * | 8/2000 | Berc et al. | 714/47.2 |
| 6,175,814 B1 | 1/2001 | Chrysos et al. | |
| 6,381,676 B2 | 4/2002 | Aglietti et al. | |
| 6,385,637 B1 * | 5/2002 | Peters et al. | 718/107 |
| 6,487,578 B2 | 11/2002 | Ranganathan | |
| 6,535,905 B1 | 3/2003 | Kalafatis et al. | |
| 6,549,930 B1 | 4/2003 | Chrysos et al. | |
| 6,560,717 B1 * | 5/2003 | Scott et al. | 714/4.1 |
| 6,957,432 B2 | 10/2005 | Ballantyne | |
| 7,051,329 B1 | 5/2006 | Boggs et al. | |
| 7,657,893 B2 | 2/2010 | Armstrong et al. | |
| 2001/0054057 A1 | 12/2001 | Long et al. | |
| 2001/0056456 A1 | 12/2001 | Cota-Robles | |
| 2002/0059544 A1 * | 5/2002 | Boucher et al. | 714/38 |
| 2002/0163520 A1 | 11/2002 | Hardin et al. | |
| 2003/0004683 A1 | 1/2003 | Nemawarkar | |
| 2003/0033509 A1 | 2/2003 | Leibholz et al. | |

(Continued)

OTHER PUBLICATIONS

U.S. Appl. No. 10/422,025, filed Oct. 26, 2011, 4 pages.

(Continued)

*Primary Examiner* — Daniel Pan
(74) *Attorney, Agent, or Firm* — Stephen R. Tkacs; Stephen J. Walder, Jr.; Diana R. Gerhardt

(57) ABSTRACT

An aspect of the present invention improves the accuracy of measuring processor utilization of multi-threaded cores by providing a calibration facility that derives utilization in the context of the overall dynamic operating state of the core by assigning weights to idle threads and assigning weights to run threads, depending on the status of the core. From previous chip designs it has been established in a Simultaneous Multi Thread (SMT) core that not all idle cycles in a hardware thread can be equally converted into useful work. Competition for core resources reduces the conversion efficiency of one thread's idle cycles when any other thread is running on the same core.

18 Claims, 5 Drawing Sheets

U.S. PATENT DOCUMENTS

| | | | |
|---|---|---|---|
| 2004/0054876 | A1 | 3/2004 | Grisenthwaite et al. |
| 2004/0139302 | A1* | 7/2004 | Flautner et al. ............... 712/220 |
| 2004/0216113 | A1 | 10/2004 | Armstrong et al. |
| 2005/0086660 | A1* | 4/2005 | Accapadi et al. ............. 718/107 |
| 2005/0149929 | A1 | 7/2005 | Srinivasan et al. |
| 2005/0198635 | A1 | 9/2005 | Olszewski et al. |
| 2006/0037025 | A1 | 2/2006 | Janssen et al. |
| 2006/0173665 | A1 | 8/2006 | Arndt et al. |
| 2008/0086395 | A1 | 4/2008 | Brenner et al. |

OTHER PUBLICATIONS

"cpu utilization monitor.", http://lists.oziabs.org/pipermail/linuxppc64-dev/2004-March/001312.html. printed from the Internet on Oct. 31, 2011; 4 pages.

Huang, Wayne et al., "CPU monitoring and tuning", http://www.ibm.com/developerworks/aix/library/au-aix5_cpu/index.html, 2005, printed from the Internet on Oct. 31, 2011, 17 pages.

* cited by examiner

WEIGHTED-REGION CYCLE ACCOUNTING FOR MULTI-THREADED PROCESSOR CORES

This invention was made with United States Government support under Agreement No. HR0011-07-9-0002 awarded by DARPA. The Government has certain rights in the invention.

BACKGROUND

The present invention relates generally to processors and computing systems, and more particularly, to a simultaneous multi-threaded (SMT) processor. The present invention also relates to processor utilization, system utilization, and system capacity accounting systems.

Modern micro-processors are usually superscalar, which means a single processor can decode, dispatch, and execute multiple instructions each processor cycle. These modern processors may also support SMT, which means each processor can concurrently execute more than one software program (thread) at a time.

SMT processors provide an efficient use of processor resources, as multiple threads may simultaneously use processor resources. Multiple threads are concurrently executed in an SMT processor so that multiple processor execution units, such as floating point units, fixed point instruction units, load/store units and others can be performing tasks for one (or more depending on the execution units' capabilities) of multiple threads simultaneously. Storage and register resources may also be allocated on a per-thread basis.

Accounting for processor time use is necessary for administration of computer services sales, as well as for internal cost-accounting management when, for example, some processor runs are for research and development activities that permit the hardware to be capitalized in a different manner for tax purposes than other uses. A server may be partitioned and processor time sold to multiple users "on demand" or on an as-used basis. Additionally, processor time may be utilized by hardware owners or lessors and also subcontracted out to entities paying for services. Therefore, accurate accounting for processor execution time is a necessity in computer architectural and software models.

In single-threaded processing systems, accounting is generally straightforward. A count of processor cycle use or even simple "wall-clock" time measurement can be provided for complete job runs, as even if multiple threads within multiple programs are executed, they are not executed simultaneously, but sequentially. A tally of cycle times is maintained until a job is complete and the total is presented for accounting purposes. The measured time correlates directly to processor resource utilization.

In an SMT processor, two or more threads may be simultaneously executing within a single processor core and the usage of resources by each thread is not easily determined by a simple execution count or time measurement. It is therefore desirable to provide a method and apparatus that can account for overall processor time usage in an SMT processor. It is further desirable to provide a method for accounting of resource usage within an SMT processor distributed among threads executing within such a processor.

Early core designs did not support the concurrent execution of multiple hardware threads. This made the measurement of utilization a fairly simple matter of accumulating the time (processor cycles) doing useful work and comparing that to the overall time available on the system. The fundamental assumption is that the time spent in idle intervals can be converted into the execution of code performing useful work at nearly the same rate of code executing in non-idle intervals. The ideal conversion ratio is linear.

In order to manage processor resources most effectively, the operating system must know the portion of a processor's resource capacity that is actually consumed by each thread. A Processor Utilization Resource Register (PURR) was introduced to measure the portion of processor capacity consumed by each thread in an SMT processor core. Each thread in the processor has a PURR. Logic in the processor calculates the fraction of instruction dispatch capacity allocated to each thread and accumulates this "charge" to the PURR for each thread. The PURR attempts to divide a single interval of time amongst multiple concurrent hardware threads. The average non-idle PURR accumulation per thread divided by collection period defined the basic processor utilization metric. In previous designs, PURR accumulations were determined primarily by the logic that controls instruction dispatch policies. These accumulations were heavily influenced by thread priority and had few adjustments.

One of the primary customer applications of processor utilization is to estimate system utilization, which is used in turn by the customer to estimate system capacity. No processor utilization measurement method will exactly match system utilization for all workloads.

Finding a more adaptable and a more accurate hardware metric to estimate system utilization that is both simple to implement and durable across chip designs is a difficult task. Many approaches were tried and found lacking.

Custom combinations of existing performance counter data provided a more accurate determination of system utilization. This method worked well in the lab for development work. To support a similar performance counter-based method in the field, monitoring frameworks would have to be designed to collect performance counter at the system level at all times, which is no small task. In future chip designs, the performance counter mixture could be designed into the core logic. However this method is not attractive at this time as it is difficult to precisely predict which counter combinations would be necessary to measure utilization in future chip designs. Each chip design may necessitate a different mix of counter data.

Not having a hardware solution for conventional systems, software-only work-arounds were explored. For example, changing the priority of the idle task will change its PURR accumulation in conventional systems. The higher the priority of the idle task, the lower the net utilization measurement becomes. Both static and dynamic mixes of priority were investigated. This method was rejected for customer deployment as raising the priority of the idle task noticeably degrades the performance of other threads in the core. This adversely affected commercial batch workloads which spend a significant amount of time executing as single threads in the core.

An alternative software method was later developed, wherein the task dispatcher in the operating system periodically redistributes PURR counts from the running software threads into the accumulator for the idle task. The amount to redistribute was adjusted by trial and error. However, this solution does not scale well if the number of threads per core increases to the point where operating system PURR adjustments are rendered inaccurate.

What is needed is a device and method that is operable to accurately estimate a system's maximum capacity to perform useful work based on an accurate measurement of a usage metric at the hardware thread level.

SUMMARY

One aspect of the present invention provides a method of measuring usage of a processor operating at a clock cycle, wherein the processor is operable to simultaneously process multiple instructions via at least one thread during a clock cycle, wherein each thread is in one of a run state where the instruction therein is executing and is using a first amount of processor usage, an idle state where the instruction therein is not executing and is using a second amount of processor usage that is lower than the first amount of processor usage or a nap state where the instruction therein is suspended and is using a third amount of processor usage that is lower than the second amount of processor usage, and wherein each instruction that is in a run state is additionally in one of a dispatch state using a fourth amount of processor usage or a non-dispatch state using a fifth amount of processor usage that is lower than the fourth amount of processor usage. The method comprises determining an initial usage for each thread, determining whether thread is in a run state or an idle state, multiplying a first weighting factor to the initial usage for each thread determined to be in a run state to generate corresponding fractional run state portions of usage and multiplying a second weighting factor to the initial usage for each thread determined to be in an idle state to generate corresponding fractional idle state portions of usage.

Additional features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE SEVERAL VIEWS OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
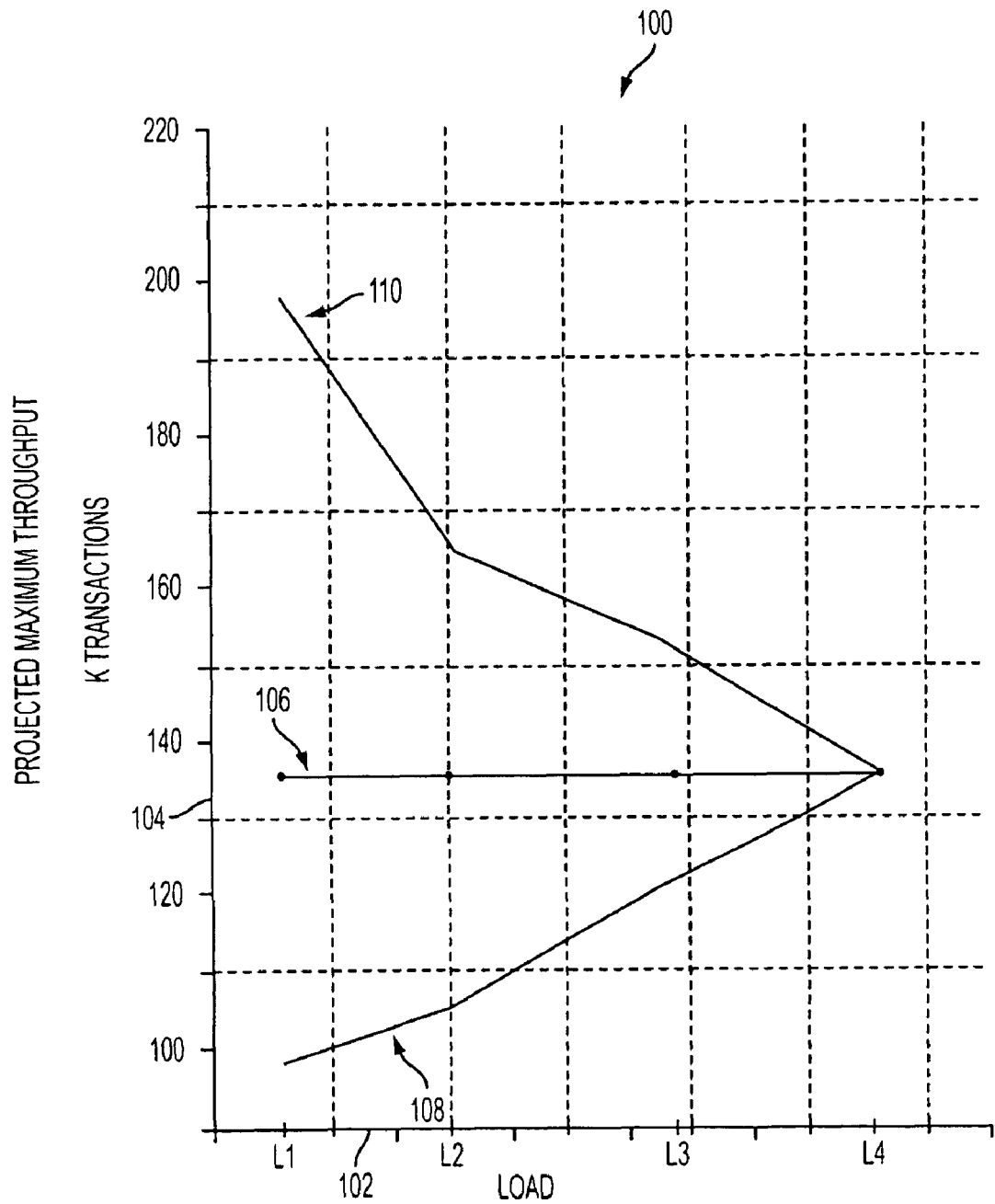
FIG. 1 is a graph that demonstrates the operating envelope of PURR calculations as applied to the measurement of system capacity.

FIG. 1 is a graph 100 that demonstrates the characteristics of examples of previous PURR calculations as applied to a two threaded processor core. In FIG. 1 the X-axis 102 represents increasing system load from left to right, whereas the Y-axis 104 represents the maximum system capacity (measured in 1000 transaction increments). Capacity is based on a linear projection using current utilization of the processor and the measured transaction rate of the system. There are measurements taken at four increasing processing loads $L_1, L_2, L_3$ and $L_4$; where $L_4$ is the maximum load the system can handle.

Given a current processor utilization, for example measured at $L_1$, and the corresponding measured throughput (not shown), the graph indicates the estimate of the maximum throughput in kilo transactions that the system can provide. Line 106 represents the ideal projection of system capacity, which is in what a customer would be particularly interested. For example, if the system is running at 20% utilization, and there is a measured 1,000 transactions, then a person might intuitively presume that if the system were to run at 100% utilization, then there would be 5,000 measured transactions.

There is a lower and upper bound on the conversion of idle cycles into useful work. The lower bound assumes that all idle cycles in a thread under all core conditions can be converted equally into useful work. This results in an optimistic estimation of utilization. The upper bound is conservative, counting idle cycles only when all threads in a core are idle. This results in a pessimistic estimation of utilization. When considered together, the two bounds create an envelope around the ideal conversion rate.

Lower bound curve 108 represents the most pessimistic estimation of processor utilization. Points on curve 108 are determined by providing "capacity credit" only when all threads in a core are idle. This curve is comparatively stingy with respect to estimating what the maximum capacity of the system will be. Curve 110 represents the most optimistic estimation of processor utilization. Points on curve 110 are determined by providing the same amount of "capacity credit" when one thread is idle as when two threads are idle. This estimation does not take into account the fact that, with one thread idle, the processor utilization will not be as high as with two free threads.

Figure 2:
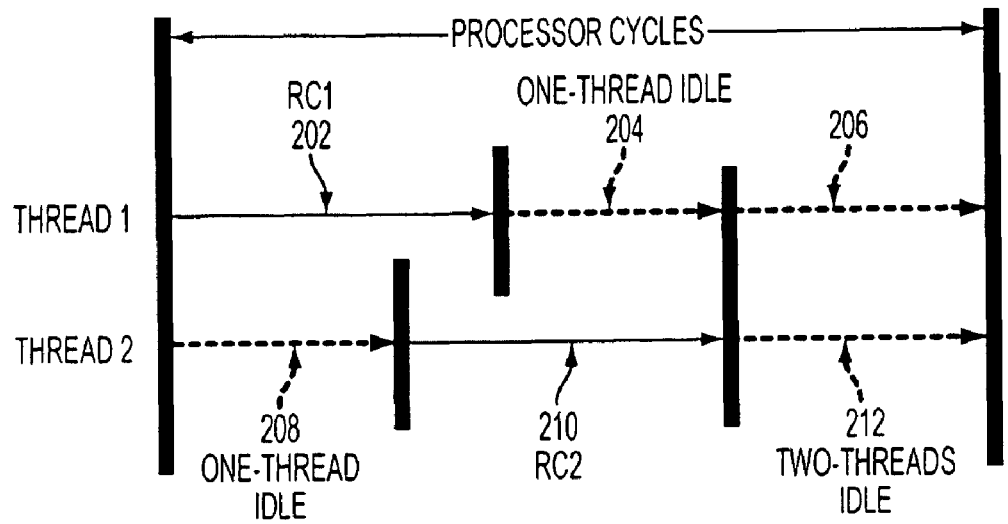
FIG. 2 illustrates how the processor utilization component for the points on curve 110 of FIG. 1 are calculated.

FIG. 2 illustrates how the processor utilization component for points on curve 110 are calculated. For one data collection period, as illustrated in the figure, a first thread, Thread 1 is running during a run cycle period RC1 202, and is idle during periods 204 and 206. A second thread, Thread 2, is idle during period 208, is running during a run cycle period RC2 210 and is idle during period 212. It is clear from the figure that during a portion of run cycle period RC1 202 and during a portion of run cycle period RC2 210, one of the threads is idle. Only in periods 206 and 212 are both thread concurrently idle. Note that 208, 204, and 212 represent accumulations of cycles for the three regions of concurrent thread operation as measured in the total collection period defined by "Processor Cycles." The processor utilization is calculated by adding the Thread 1 run cycle RC1 204 and the Thread 2 run cycle RC2 208 and dividing by the sum of the processor cycles 212 every time a thread runs. This is the minimum utilization bound, Umin= (RC1+RC2)/(PC1+PC2), which will define the maximum capacity of the system to perform useful work.

Figure 3:
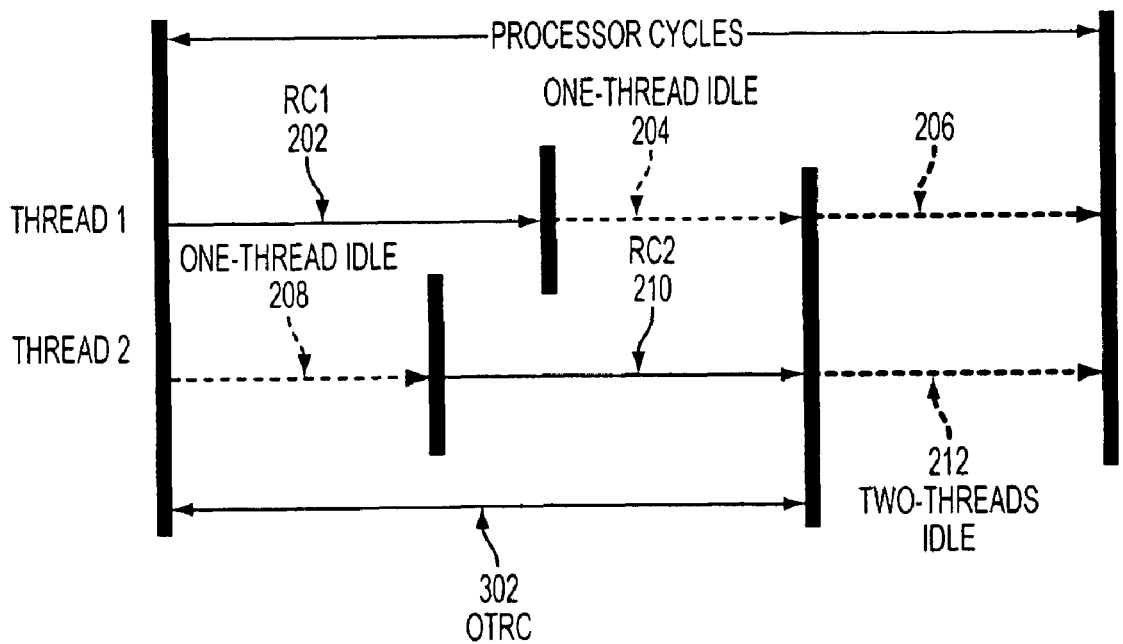
FIG. 3 illustrates how the processor utilization component for the points on curve 108 of FIG. 1 are calculated.

FIG. 3 shows how the processor utilization component for points on curve 108 of FIG. 1 are calculated. The utilization is calculated as Umax=OTRC/(Average Processor Cycles) where OTRC 302 is the number of cycles where either Thread-1 or Thread-2 are in Run State (RC1 202 or RC2 210). This places a maximum bound on processor utilization resulting in a minimum amount of idle cycles that can be turned into useful work. Only when both threads are idle, in periods 206 and 212, does the system consider the processor idle and able to perform useful work.

When lower curve 108 and upper curve 110 are considered together, the two bounds create an envelope around the ideal utilization 106. Although this envelope may be somewhat useful, the ability to determine the ideal processor utilization represented by line 106 remained elusive. The importance of the ideal processor utilization 106 and the negative effects of using lower bound curve 206 or upper bound curve 208 will now be described.

Suppose a customer wants to lease processing usage on a processor core from a vendor and will be billed accordingly. For example, suppose the customer is monitoring the vendor's processor core utilization at load $L_1$ to determine whether to purchase time on a thread. This scenario will be described in two instances, first—when the vendor's processor utilization is monitored using the PURR calculation resulting in curve 108, and second—when the vendor's processor utilization is monitored using the PURR calculation resulting in curve 110.

In the first instance, suppose the customer sees that the vendor's processor is currently running at load $L_1$ and that the estimated remaining throughput of the vendor's processor is 100 K transactions/cycle. Further, the customer knows that processing requirements to run his or her processing thread will push the throughput of the processor to 120 k transactions/cycle. In such a scenario, the customer may incorrectly presume that the vendor's processor cannot handle the extra load. However, the ideal estimated throughput represented by line 106, which is unknown to the customer and the vendor, indicates that the processor can handle approximately 135 k transactions/cycle. As such, the vendor may lose a sale as a result of the inaccurate processor utilization estimation.

In the second instance, suppose the customer sees that the vendor's processor is currently running at load $L_1$ and that the estimated remaining throughput of the vendor's processor is close to 200 K transactions/cycle. Further, the customer knows that processing requirements to run his or her processing thread will push the throughput of the processor to 160 k transactions/cycle. In such a scenario, the customer my incorrectly presume that the vendor's processor can handle the extra load. However, the ideal estimated throughput represented by line 106, which is unknown to the customer and the vendor, indicates that the processor can only handle approximately 135 k transactions/cycle. As such, the customer may purchase processing time, but may not adequately receive that which is expected, because the additional load is too much for the system to handle as a result of the inaccurate processor utilization estimation.

The weight registers of this invention can be used to define a family of utilization curves that can positioned between the upper and lower bounds of idle cycle conversion efficiency. On a cycle-by-cycle basis a weighted-region PURR dynamically selects a register that is used to provide each hardware thread's contribution to fractional PURR Accumulators.

Static configuration of the PURR logic is performed by a software executive. Thread Context and a set of weight registers make up the majority of the static configuration data.

Thread Context is defined as a ceiling on the number of hardware threads that are readily available to the operating system. The concept of Thread Context makes it possible to decouple the dynamic changes in Core Thread Mode from the context in which the customer wishes to evaluate utilization. Core Thread Mode provides an indicator as to how the performance-related resources in the core have been dynamically arranged to maximize performance at any given time. Thread Context also makes it possible to know whether or not to accumulate idle PURR counts for threads that are suspended (in NAP mode).

After static configuration is completed a set of core state signals are used to continuously select a weight register. The main core state signals are discussed here in the order of decreasing rate of input signal change: Dispatch valid (one signal for each thread); Run Latch State (one signal for each thread); and Core Thread Mode (one state for each mode).

The core state input that most frequently changes is the Dispatch Valid signal. Dispatch Valid is asserted each time an individual thread dispatches an instruction. This signal effectively divides the weight registers into two equal sets. One half can be selected when there is an instruction dispatch; the other half can be selected when there is no dispatch.

Another set of core state signals that change frequently are the Run Latches. There is one Run Latch signal for each hardware thread in the core. When an operating system enters idle, or if the thread is suspended, the Run Latch is disabled for that thread. Each Run Latch signal operates independently. The major regions of hardware thread concurrency are defined by the number and location of threads with the Run Latch asserted.

Modern multi-thread cores may reconfigure chip resources automatically dependent on the number of active hardware threads. For example if only a single hardware thread is running in the core that thread may be given all the core's resources to improve performance. Because there are significant differences in the performance across the core thread modes, different weight registers are selected depending on the core thread mode. Core Thread Mode provides feedback on the performance configuration of the performance resources.

Once a weight register is selected (based on the core state listed above) the PURR logic computes idle and non-idle portions. The Run Latch status signals are then used to guide the idle and non-idle weight values to the appropriate Fractional PURR Accumulators.

Figure 4:
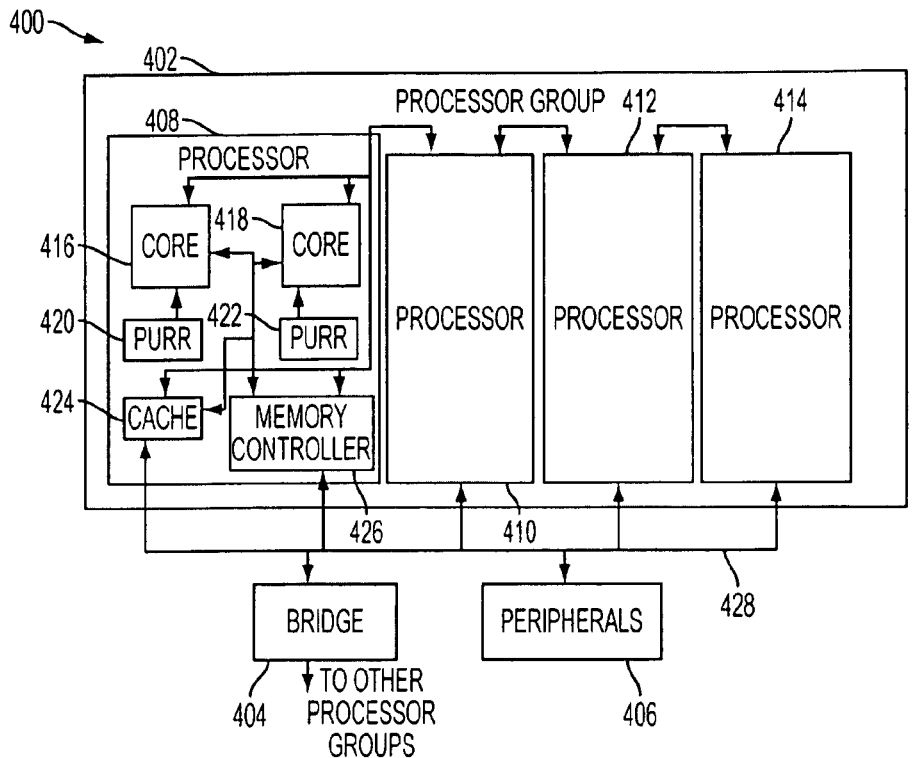
FIG. 4 illustrates a block diagram of a system in accordance with an embodiment of the present invention.

FIG. 4 illustrates a block diagram of a system 400 in accordance with an embodiment of the present invention. System 400 includes a processor group 402 that may be connected to other processor groups via a bridge 404 forming a super-scalar processor. Processor group 402 is connected to various peripherals 406, non-limiting examples of which may include a cache unit, system local memory and other processors.

Within processor group 402 are a plurality of processors 408, 410, 412 and 414, which may be fabricated as a single unit. Each processor includes, for example as illustrated in processor 408, processor cores 416 and 418, PURRs 420 and 422, a cache 424 and a memory controller 426. Cores 416 and 418 provide instruction execution and operation on data values for general-purpose processing functions. Bridge 404, as well as other bridges within system 400 provide communication over wide buses with other processor groups and a bus 428 provides connection of processors 408, 410, 412, 414, bridge 404 and peripherals 406. Other global system memory may be coupled external to bridge 404 for access by all processor groups.

Processor cores 416 and 418 are simultaneous multi-threaded (SMT) processors capable of concurrent execution of multiple threads. Cache 424 provides local memory storage for core 416 and core 418. Cache 424 may additionally provide memory storage for processors 410, 412 and 414. Memory controller 426 controls access to external memory in addition to cache for core 416 and core 418. PURR 420 monitors processor utilization of core 416, whereas PURR 422 monitors processor utilization of core 418.

Processor cores 416 and 418 further support different operating modes for efficient execution of active threads. Transitioning between multi-threaded modes provides an advantage in adapting to one or more of the above-described conditions, and embodiments of the present invention provide a more accurate accounting for processor time in a manner consistent with a processor that provides processor time accounting responsive to such transitions.

Therefore, in an embodiment described herein, PURR 420 and PURR 422 are operable to account for all processor core 416 and processor core 418 cycles, respectively, based on an estimate of execution unit and resource usage. Only PURR 420 will be discussed for brevity, wherein each may operate in a similar manner.

As discussed in more detail below, PURR 420 is operable to provide weighting factors for each thread to more accurately account for processor utilization of core 416. These weighting factors are based on the state of each thread operating on core 416. When a thread is in a running state it is doing useful work for the customer. If a thread is in a running state, it may be in either a dispatch state or a non-dispatch state. When a thread is in a dispatch state instructions are being issued in the processor pipeline. When a thread is in a non-dispatch state no instructions are being issued in the processor pipeline. When a thread is in an idle state it is not executing instructions that are performing useful work. In idle state the Run Latch is disabled. A specific type of idle state is a nap state, wherein all instruction dispatches are suspended.

There are certain instances when PURR 420 may not provide weighting factors for each thread. When only a single-thread is running on core 416, PURR 420 does not use any weight registers. When no threads are running on core 416, PURR 420 equally divides the processor utilization units amongst idle threads. When all threads are running on core 416, PURR 420 equally divides the processor utilization units amongst non-idle threads.

An aspect of the present invention improves the accuracy of measuring processor utilization of multi-threaded cores by providing a calibration facility that derives utilization in the context of the overall dynamic operating state of the core by assigning weights to idle threads and assigning weights to run threads, depending on the status of the core. From previous chip designs it has been established in a Simultaneous Multi Thread (SMT) core that not all idle cycles in a hardware thread can be equally converted into useful work. Competition for core resources reduces the conversion efficiency of one thread's idle cycles when any other thread is running on the same core. The benefits of the PURR utilizing weighted factors in accordance with an aspect of the present invention will now be described with reference to FIG. 5.

Figure 5:
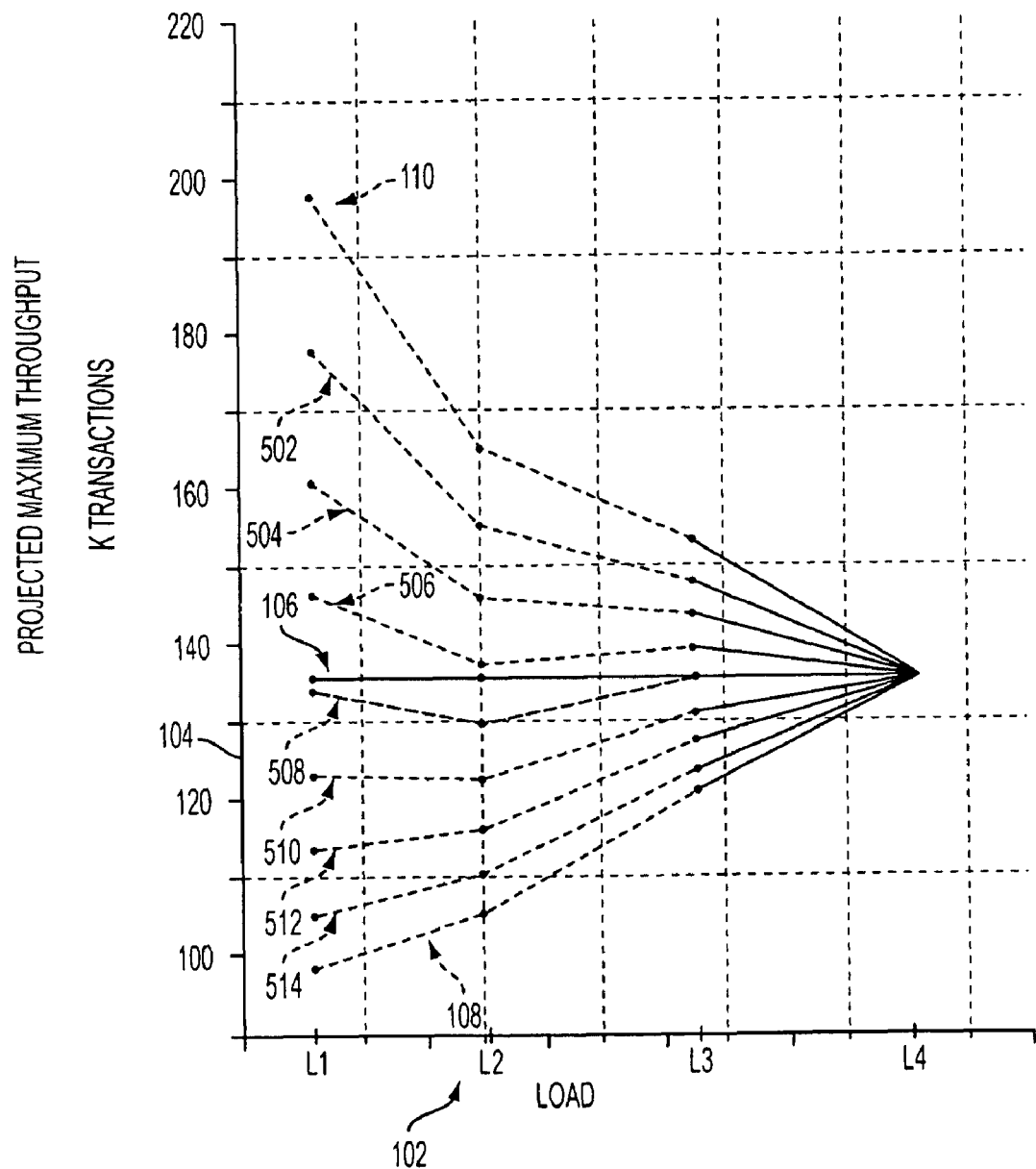
FIG. 5 illustrates is a graph that demonstrates the characteristics of weighted-region PURR calculations, in accordance with an aspect of the present invention, as applied to a two threaded processor core.

FIG. 5 is a graph that demonstrates characteristics of a simplified weighted Processor PURR as applied to a two threaded processor core in accordance with an aspect of the present invention. FIG. 5 differs from FIG. 1 in that the graph of FIG. 5 includes curves based on a first set of weighting factors when one thread is idle and a second set of weighting factors when two threads are idle, as described in more detail below.

In FIG. 5, one idle thread is assigned a first predetermined weight. When two threads are idle, each idle thread is assigned a second predetermined weight, which is less than the first predetermined weight, because more core resources are available. Weight register values may be used to define a family of utilization curves 502, 504, 506, 508, 510, 512 and 514 illustrated in the figure, which can be positioned between upper 104 and lower 102 bounds of idle cycle conversion efficiency.

Consider curve 502 in FIG. 5. This curve was produced by assigning weights 16:09 to idle cycles. If two threads are idle, each thread receives a weight of 16. If one thread is idle, that thread receives a weight of 9. This weighting procedure was continued in the lab for all the different weight combinations shown and plotted in FIG. 5 as curves 502, 504, 506, 508, 510, 512 and 514. The curve that produced the best result and most accurately predicted the ideal processor utilization is curve 508 with a weight W16:12, which was within 5% of ideal.

The example illustrated in FIG. 5 merely illustrates how the weighting aspect of the present invention may more accurately predict the processor utilization in a two thread processing core. Of course any number threaded core may be monitored in accordance with the present invention. Further, other weighting factors may be used, non-limiting examples of which include, weighting factors based on run threads, weighting factors based on the number run threads, weighting factors based on a total number of threads, weighting factors based on dispatch threads, weighting factors based on the number of dispatch threads, weighting factors based on nap threads, or any combination thereof. One example of establishing weighting factors for a four (4) thread SMT processor will now be described with reference to FIG. 6.

Figure 6:
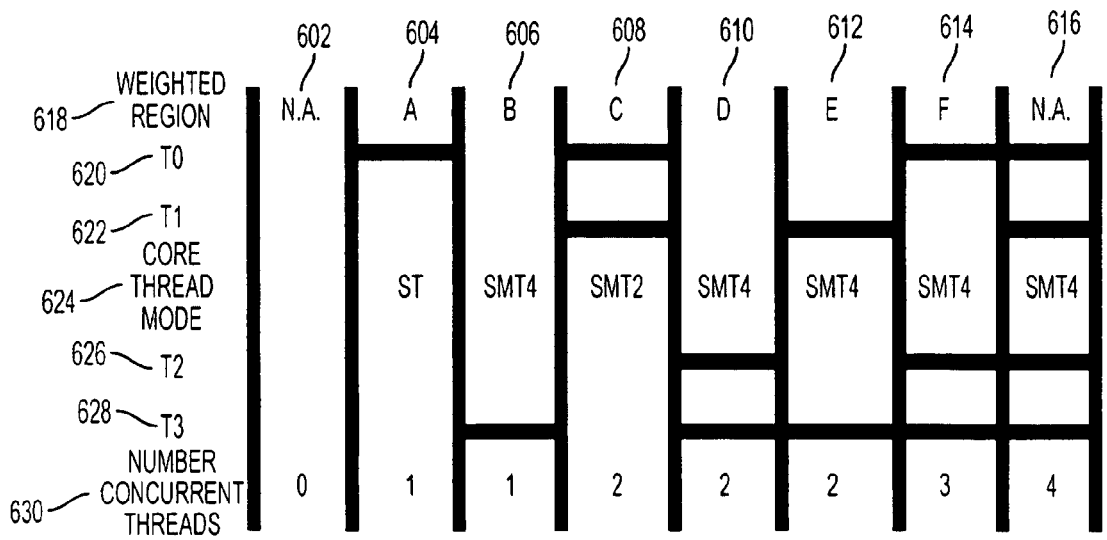
FIG. 6 illustrates establishing weighting factors for a four (4) thread SMT processor.

In FIG. 6, eight (8) weighted regions of a four thread SMT processor are illustrated. Each state may have specific weighting factors associated therewith, which will be described in greater detail later. In the figure: state 602 has no run threads; each of states 604 and 606 have one run thread; states 608, 610 and 612 each have two run threads; state 614 has three run threads, and state 616 has four run threads. The left side of the figure includes a plurality of row designations: row 618 is designated as "Weighted Region"; row 620 is designated as "T0"; row 622 is designated as "T1"; row 624 is designated as "Core Thread Mode"; row 626 is designated as "T2"; row 628 is designated as "T3", and row 630 is designated as "Number Concurrent Threads." Row 618 will dictate which weighting factors are to be applied to specific threads, as described in more detail below. Rows 620, 622, 626 and 628 correspond to the specific threads T0-T3 that are capable of running on the four thread processor. Row 624 indicates whether the four thread processor is operating, is operating in a single thread mode (ST), is operating in a simultaneous multi-thread mode using two threads (SMT2), or is operating in a simultaneous multi-thread mode using four threads (SMT4). This row indicates the number of hardware threads that are not suspended, in a NAP mode, and may be used to optimize chip resources in order to obtain the best performance. Row 630 indicates the number of concurrent run threads on the four thread processor.

In state 602, as indicated by row 630, no threads are running on the processor. Accordingly, row 624 does not indicate a mode of operation.

In state 604: as indicated by row 620, thread T0 is running; as indicated by row 624, the processor is operating in a ST mode; and as indicated by row 630, the processor has one thread running.

In state 606: as indicated by row 628, thread T3 is running; as indicated by row 624, the processor is operating in a SMT4 mode; and as indicated by row 630, the processor has one thread running.

In state 608: as indicated by row 620, thread T0 is running; as indicated by row 622, thread T1 is running; as indicated by row 624, the processor is operating in a STM2 mode; and as indicated by row 630, the processor has two threads running.

In state 610: as indicated by row 626, thread T2 is running; as indicated by row 628, thread T3 is running; as indicated by row 624, the processor is operating in a STM4 mode; and as indicated by row 630, the processor has two threads running.

In state 612: as indicated by row 622, thread T1 is running; as indicated by row 628, thread T3 is running; as indicated by row 624, the processor is operating in a STM4 mode; and as indicated by row 630, the processor has two threads running.

In state 614: as indicated by row 620, thread T0 is running; as indicated by row 626, thread T2 is running; as indicated by row 628, thread T3 is running; as indicated by row 624, the processor is operating in a STM4 mode; and as indicated by row 630, the processor has three threads running.

In state 616: as indicated by rows 620, 622, 626 and 628, all threads are running; as indicated by row 624, the processor is operating in a STM4 mode; and as indicated by row 630, the processor has four threads running.

Determination of weighting factors may be based on many parameters.

If no threads are running, e.g., state 602, or if all threads are running, e.g., state 616, then there may be no need for weighting factors because the processor utilization for all threads are treated equally.

As the number of threads running (with the exception of all threads) increases, the weighting factors should reflect such an increase. For example, weighting factors for states 608, 610, 612 and 614 should be higher than weighting factors for states 604 and 606, because more running threads reflect more processor utilization.

An ST mode, e.g., state 604, may have less of a weighting factor than a SMT2 mode, e.g., state 608, which may have less of a weighting factor than a SMT4 mode, e.g., state 610.

A state having adjacent threads, e.g., state 610, may have a higher weighting factor than a state having non-adjacent threads, e.g., state 612, because there is less likelihood of resource sharing in non-adjacent threads.

Initially, weights may be determined for specific states of processor operation. Such states are based on parameters, non-limiting examples of which include the number of threads, the number of running threads, the number of idle threads, the number of dispatching threads, the number of non-dispatch threads, etc. The different weighting schemes may be tested to optimize the weighting scheme, i.e., arrive at the weighting scheme that most closely approximates the ideal processor utilization. Once the weights are determined and assigned to specific states, a hardware register may monitor parameters of a processor. By using the monitored parameters of the processor, the hardware register may quickly and accurately accumulating fractional processor utilization by way of multiplying the predetermined weighting factors for each thread in the processor.

Figure 7:
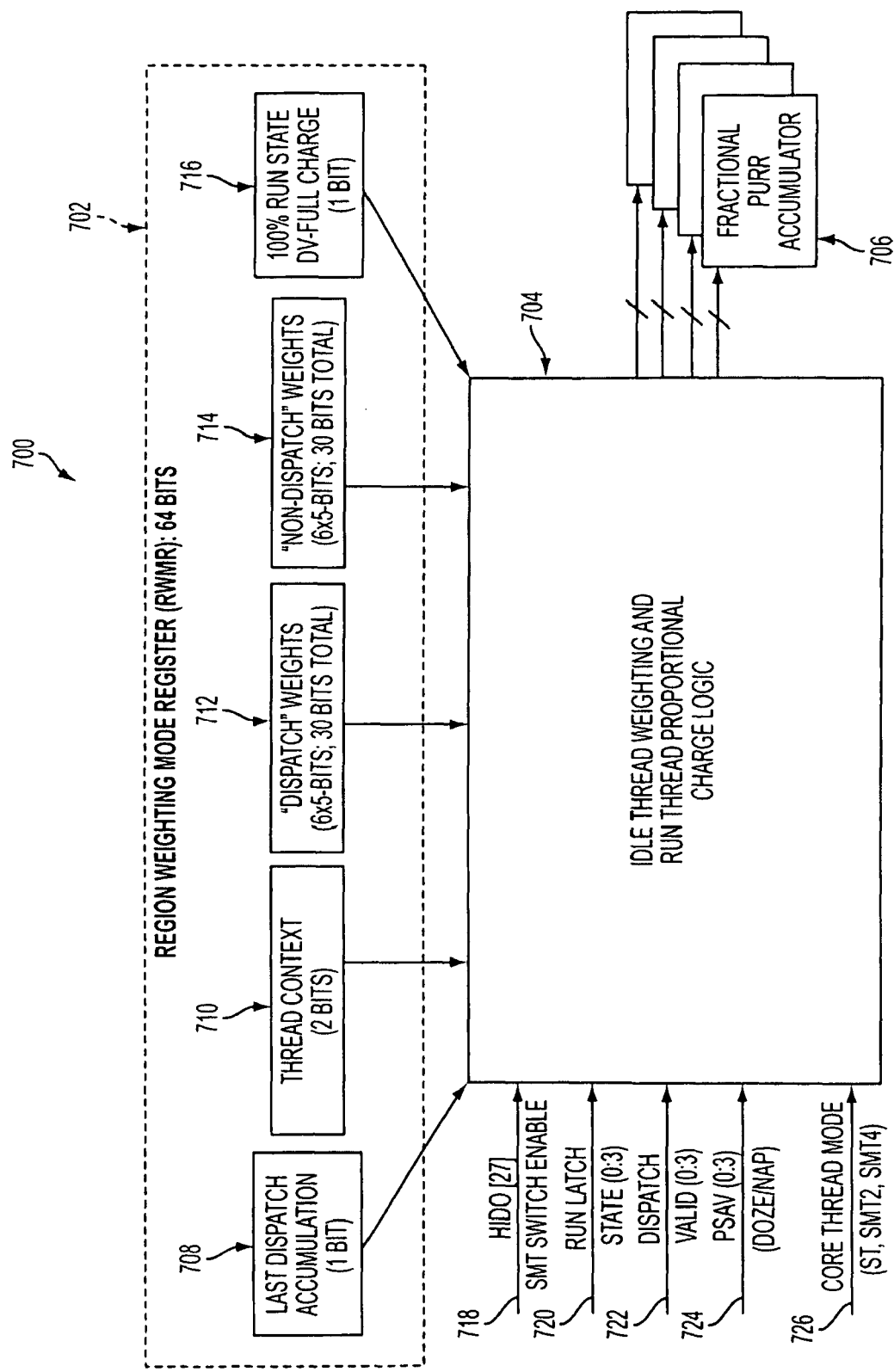
FIG. 7 illustrates a weighted-region PURR device in accordance with an example embodiment of the present invention.

FIG. 7 illustrates an exemplary weighted PURR that is operable to accurately monitor processor utilization in a SMT processor core. In the figure, weighted PURR includes a Region Weighting Mode Register (RWMR) 707, an Idle Thread Weighting and Run Thread Proportional Charge Logic portion 704, and a plurality of Fractional PURR Accumulators 706. RWMR 707 includes a Last Dispatch Accumulation portion 708, a Thread Context portion 710, a "Dispatch" Weights portion 712, a "Non-Dispatch" Weights portion 714, and a 100% Run State DV-Full Charge portion 716.

A Thread Context is defined as a ceiling on the number of hardware threads that are readily available to the operating system or should be considered available. Thread context is set by Thread Context register 708, which will be described in detail later. In this embodiment, Thread Context register 504 is encoded as a 2-bit field in RWMR register 702. There is an entry for 1, 2 or 4 thread concurrency ceilings or the amount of threads available to the system. For example if Thread Context register 708 is set to 01, the processor in which weighted PURR 700 is monitoring, is operating in a ST mode. For example, in state 604 of FIG. 6, Thread Context register 708 set to 01 would establishes that T0 is the only thread available to the system and will receive a weight based on this information. In this case the system will use weight corresponding to a previously established state 604. This context mode 01 may also establish that Thread 1 (T1), Thread 2 (T2), Thread 3 (T3) are in NAP mode. In NAP mode, a hardware thread is in a specific type of idle, wherein it stops executing instructions. Unlike previous PURR implementations, a weighted PURR in accordance with the present invention will accumulate PURR counts for threads that are in NAP mode and a thread context makes it possible to treat NAP threads in the same manner as operating-system idle. No special software compensation is required to make an accurate idle cycle determination when a hardware thread is no longer executing instructions as a result of the thread being in a NAP mode.

Unlike previous PURR designs, a weighted PURR in accordance with the present invention takes into account the dynamic core state to more accurately allocate PURR contributions across dramatic changes in core performance. Returning to FIG. 7, processor state signals 718, 720, 722, 724 and 726 are used to continuously select a weighting factor to be applied to the threads to accurately monitor the processor usage. Processor state signals 718, 720, 722, 724 and 726 will now be discussed in the order of decreasing rate of input signal change.

A Dispatch Valid signal 722 is the core state input that most frequently changes. There is a Dispatch Valid signal 722 signal for each thread, in this case four signals (0:3). Dispatch Valid signal 722 is asserted each time an individual thread dispatches an instruction. This signal effectively divides weight registers into two equal sets. One half can be selected in accordance with data from portion 712 of RWMR 702 when there is an instruction dispatch, and the other half can be selected in accordance with data from portion 714 of RWMR 702 when there is no instruction dispatch.

A Run Latch signal 720 is additionally provided for each thread (0:3). When an operating system enters idle, or if the thread is suspended, a status bit of Run Latch signal 720 is disabled or cleared for that thread, thus obtaining a value of 0. Each Run Latch signal 720 operates independently. The major regions of hardware thread concurrency, as illustrated for example in row 630 of FIG. 6, are defined by the number and location of threads (T0 through T3) with the status bit of Run Latch signal 720 being asserted getting a value of 1. In other words the number and location of running threads define the concurrency region. A weighted PURR in accordance with the invention takes into account the state of all four Run Latch signals 720 to select the associated weighting factor for each hardware thread. An accumulation of fractional PURR weights from plurality of Fractional PURR Accumulators 706 in accordance with the present invention is based on the concept of Region Weighting where the region is determined primarily by the dynamic count of concurrent threads that are in a run state determined by Run Latch signals 720.

Core Thread Mode signal 726 indicate the number of threads that are not suspend and correspond to ST, SMT2, and SMT4 modes of operation. Returning to FIG. 6, state 604 would have Core Thread mode signal 726 indicating an ST mode of operation when T0 is running, whereas T1, T2, and T3 are in a NAP mode. State 608 would have Core Thread mode signal 726 indicating an SMT2 mode of operation when T0 and T1 are running, whereas T2 and T3 are in a NAP mode. Core Thread Mode signal 726 would indicated an SMT4 mode of operation when no threads are in a NAP mode. The present invention dynamically tracks core thread mode to improve the accuracy of PURR cycle accumulations.

PSAV signal 724 determines whether a thread is in a NAP mode of operation. There is one PSAV signal for each hardware thread in the core (0:3).

Modern multi-thread cores may reconfigure chip resources automatically dependent on the number of active hardware threads. For example if only a single hardware thread is running in the core, that thread may be given all the core's resources to improve performance. Because there are significant differences in the performance across the core thread modes, different weighting factors may be selected depending on the core thread mode.

Now that dynamic changes in core state have been established static configuration can be included. RWMR 702 in an example embodiment comprises a 64 bit special purpose register (SPR) that contains all the static configuration information for PURR cycle accounting or PURR-Weight. The static configuration data consists of weights and controls and there is one RWMR per core. Thread Context portion 710, "Dispatch" Weights portion 712 and "non-Dispatch" Weights portion 714 make up the majority of the static configuration data.

Thread Context portion 710, which sets the concurrency ceiling, is encoded as a 2-bit field in RWMR 702. There is an entry for one, two, and four thread concurrency ceilings. An entry of 00—disables the use of "Dispatch" Weights portion 712 and "non-Dispatch" Weights portion 714 and Run Latch signal 720. An entry of 01—enables single-thread context mode. Core Thread Mode signal 720 would indicate a ST mode of operation, and region weighted accounting is kept for a single thread, e.g., T0 in state 604 of FIG. 6, only until the context is changed. An entry of 10—enables two-thread context mode. Core Thread Mode signal 720 would indicate a STM2 mode of operation, and region weighted accounting is kept for two threads, e.g., T0 and T1 in state 608 of FIG. 6, only until the context is changed. An entry of 11—enables four-thread context mode. Core Thread Mode signal 720 would indicate a STM4 mode of operation and region weighted accounting is kept for all four threads until the context is changed.

Previous PURR implementations had a single weighting ratio between threads that dispatch and instruction and those that do not. In accordance with the present invention, the weighted PURR selects different programmable weight registers when a thread dispatches an instruction or when it does not dispatch an instruction. Using separate dispatch versus non-dispatch weightings can be helpful in calibrating the accuracy of software thread accounting. This calibration can be performed nearly independently of the calibration for overall utilization. In an example embodiment, the weights reside in twelve registers in "Dispatch" Weights portion 712 and "non-Dispatch" Weights portion 714, that emulate a "lookup table," one entry for each combination of the overall core state. These registers are 5-bits, providing a minimum of 3% accuracy (1/32nd) in positioning for each curve point between the curve 108 and curve 110 of FIG. 5. The average resolution can be improved to 1.5% (1/64$^{th}$) through the use of 64-bit fractional PURR Accumulators 706 and careful design definition of the values contained in "Dispatch" Weights portion 712 and "non-Dispatch" Weights portion 714.

Previous PURR implementations had a single weighting ratio between threads that dispatch and instruction and those that do not. The weighted PURR in accordance with the present invention selects different programmable weight registers when a thread dispatches an instruction, e.g., (six registers) in "Dispatch" Weights portion 712, or when it does not dispatch an instruction, e.g., (six registers) "non-Dispatch" Weights portion 714. If any thread dispatches in the core and has its Run Latch signal 720 set, then the weight is drawn from "Dispatch" Weights portion 712. If none of the threads are dispatching, then the weight is drawn from "non-Dispatch" Weights portion 714.

Using separate dispatch versus non-dispatch weightings can be helpful in calibrating the accuracy of software thread accounting. This calibration can be performed nearly independently of the calibration for overall utilization. A selection of a weight register from "Dispatch" Weights portion 712 and "non-Dispatch" Weights portion 714, is a function of the dynamic portion of the core including the data from Thread Context portion 710, Core Thread Mode signal (ST, SMT2, SMT4) 726, Run Latch signal 720, and Dispatch Valid signal 722. Also, the counts or value attributed to idle and run threads from the "Dispatch" Weights portion 712 and "non-Dispatch" Weights portion 714 to Fractional PURR accumulators 706 depend primarily on the number of threads that are in the Run State, which will be discussed in more detail below.

Another portion within the RWMR 702 is the DV-Full Charge portion 716, which if set is valid in all thread context modes determined by Core Thread Mode signal 726. If DV-Full Charge portion 716 is enabled and a thread dispatches, that thread receives the full Run Weight (value) from the selected weighting factor stored in "Dispatch" Weights portion 712.

Last Dispatch Accumulation portion 708 is valid only when Thread Context portion 710 is set to 00 and where weighting factors from "Dispatch" Weights portion 712 and "non-Dispatch" Weights portion 714 are used. Last Dispatch Accumulation portion 708 approximates previous PURR modes. If Last Dispatch Accumulation portion 708 is valid, it also forces the DV-Full Charge portion 716 to be on.

The final values for the weight register contents are calibrated through a set of measurements occurring in Idle Thread Weighting and Run Thread Proportional Charge Logic portion 704. Selected workloads are presented with a series of input loads and a measurement of the actual work performed is recorded in Fractional PURR Accumulator portion 706. The weighting factors from "Dispatch" Weights portion 712 and "non-Dispatch" Weights portion 714 are adjusted and the process can be iteratively repeated. On any given cycle the idle weight incremental is added equally to Fractional PURR Accumulator portion 706 for all the idle (Run Latch signal 720 is cleared) threads in the core. Unlike previous PURR designs, Fractional PURR Accumulator portion 706 of the weighted PURR in accordance with the present invention will continue to increment for a suspended thread (in NAP) based on its portion of the idle PURR. Derivation of weighting factors from "Dispatch" Weights portion 712 and "non-Dispatch" Weights portion 714 may be assisted by hardware counters that collect performance events focused within the various thread concurrency regions.

There are no hardware interlocks that prevent Thread Context portion 710 from being set incorrectly. There are additional inputs to Idle Thread Weighting and Run Thread Proportional Charge Logic portion 704, such as PSAV signal 724 and SMT Switch Enable signal 718, which are used to provide reasonable sets of weights when errors are made in setting Thread Context portion 710. PSAV signal 724 is used as the thread ceiling limit by the PURR logic. If the SMT Switch Enable signal 718 is cleared, it indicates that no automatic changes will be made to the core thread state. This implies that Thread Context portion 710 should be set at four threads.

The following discussion will cover details on weighting factors.

On every cycle, a selected weighting factor is converted into idle and non-idle portions. The counts attributed to an idle thread and a run threads depend primarily on the number of threads that are in a run state. If the selected weighting factor within "Dispatch" Weights portion 712 and "non-Dispatch" Weights portion 714 represents the "idle weight" portion, then the "run weight" portion is calculated as the maximum region count minus the idle weight. This differential relationship is reversed if the selected weighting factor within "Dispatch" Weights portion 712 and "non-Dispatch" Weights portion 714 represents the run weight portion, in which case subtraction is used to derive the idle weight incremental for Fractional PURR accumulators 706.

To simplify a weighted PURR implementation, in one example embodiment, the weighting factor is interpreted for the most part as representing a value used for "idle weight," which represents the untapped processor compute cycles that would otherwise be available for use by real (non-idle) tasks. "Idle weights" are given a value in 32nds of a cycle for Thread Context portion 710 TC=10. In this mode, SMT2 has Core Thread Mode signal 726 indicating that T2 and T3 are in a NAP mode. "Idle weights" are given a value of 64ths of a cycle for Thread Context portion 710 TC=11. In this mode SMT4 Core Thread Mode signal 726 indicating that no threads are in a NAP mode.

"Run Weights" are given a value representing the utilization of the available "running" processor cycles in 32nds or 64ths of a cycle as described above. Therefore "Run Weight" is defined as 32 minus the selected "Idle Weight" or 64 minus the selected "Idle Weight" depending on the value of Thread Context portion 710, described above.

The P7 PURR logic takes advantage of two shortcuts to reduce table size based on the formulas above. At one extreme, the single-thread context TC=01 does not require the use of any weighting factors. For the second shortcut, when no threads are running, the weighted PURR is divided equally amongst threads that are not stopped. The same distribution shortcut is used when all threads are non-idle meaning divided equally amongst run threads.

In previous PURR implementations the utilization measurement depended on the ratio of the priority of an idle thread relative to the priority of the non-idle thread. Raising the priority of an idle thread might make the end utilization measurement more accurate, but at a sacrifice in performance. In accordance with the present invention, the priority an idle thread does not affect the utilization measurement because cycle accounting for idle threads depends on the operating system setting the Run Latch. Therefore the priority of an idle thread may be dropped to the lowest setting.

In accordance with the present invention, an idle thread may even stop executing instructions if it is "suspended" in NAP mode. Unlike previous PURR implementations, in accordance with the present invention, the weighted PURR will accumulate PURR counts for threads that are in NAP mode. No special software compensation is required to make an accurate idle cycle determination when a hardware thread is no longer executing instructions because of NAP mode.

Software solutions are forced to make implicit or explicit assumptions about thread concurrency distributions when making post-collection adjustments to PURR accumulations. They are unable to track the actual cycles spent by individual threads broken down by thread concurrency regions. In accordance with the present invention, the weighted PURR will accurately track fractional PURR contributions across core state changes—even if those state changes occur on every cycle.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed as new and desired to be protected by Letters Patent of the United States is:

1. A method of measuring usage of a processor operating at a clock cycle, the processor being operable to simultaneously process multiple instructions via at least one thread during a clock cycle, said method comprising:

determining an initial usage for each thread of the at least one thread, each corresponding thread of the at least one thread being in one of a run state wherein the thread therein is executing non-idle code and is using a first amount of processor usage, an idle state wherein the thread therein is executing idle code and is using a second amount of processor usage that is lower than the first amount of processor usage, or a nap state wherein the thread therein is suspended and is using a third amount of processor usage that is lower than the second amount of processor, each instruction on a corresponding thread of the at least one thread additionally being in one of a dispatch state using a fourth amount of processor usage or a non-dispatch state using a fifth amount of processor usage that is lower than the fourth amount of processor usage;

determining whether each thread of the at least one thread is in a run state or an idle state:

multiplying a first weighting factor to the initial usage for each thread determined to be in a run state to generate corresponding fractional run state portions of usage;

multiplying a second weighting factor to the initial usage for each thread determined to be in an idle state to generate corresponding fractional idle state portions of usage;

determining whether each thread in a run state is in a dispatch state or a non-dispatch state;

multiplying a third weighting factor to the initial usage for each thread determined to be in a dispatch state to generate corresponding fractional dispatch state portions of usage; and multiplying a fourth weighting factor to the initial usage for each thread determined to be in a non-dispatch state to generate corresponding fractional non-dispatch state portions of usage.

2. The method of claim 1, further comprising:
determining the number of the at least one thread not in a nap state,
wherein said multiplying a first weighting factor to the initial usage for each thread determined to be in a run state to generate corresponding fractional run state portions of usage is based on the number of the at least one thread not in a nap state, and
wherein said multiplying a second weighting factor to the initial usage for each thread determined to be in an idle state to generate corresponding fractional idle state portions of usage is based on the number of the at least one thread not in a nap state.

3. The method of claim 2, further comprising:
determining the number of the least one thread in a non-dispatch state; and
determining the first weighting factor based on the number of the at least one thread in a non-dispatch state.

4. The method of claim 1, further comprising:
determining the number of the least one thread in a non-dispatch state; and
determining the first weighting factor based on the number of the at least one thread in a non-dispatch state.

5. The method of claim 1, further comprising:
determining the number of the at least one thread in a nap state,
wherein said multiplying a first weighting factor to the initial usage for each thread determined to be in a run state to generate corresponding fractional run state portions of usage is based on the number of the at least one thread in a nap state, and
wherein said multiplying a second weighting factor to the initial usage for each thread determined to be in an idle state to generate corresponding fractional idle state portions of usage is based on the number of the at least one thread in a nap state.

6. The method of claim 1, further comprising:
determining the number of the at least one thread not in a nap state,
wherein said multiplying a first weighting factor to the initial usage for each thread determined to be in a run state to generate corresponding fractional run state portions of usage is based on the number of the at least one thread not in a nap state, and
wherein said multiplying a second weighting factor to the initial usage for each thread determined to be in an idle state to generate corresponding fractional idle state portions of usage is based on the number of the at least one thread not in a nap state.

7. The method of claim 6, further comprising:
determining the number of the least one thread in a non-dispatch state; and
determining the first weighting factor based on the number of the at least one thread in a non-dispatch state.

8. The method of claim 1,
wherein said multiplying a first weighting factor to the initial usage for each thread determined to be in a run state to generate corresponding fractional run state portions of usage comprises multiplying a first weighting factor based on the total number of the at least one thread, and
wherein said multiplying a second weighting factor to the initial usage for each thread determined to be in an idle state to generate corresponding fractional idle state portions of usage comprises multiplying a second weighting factor based on the total number of the at least one thread.

9. The method of claim 1, further comprising:
monitoring a parameter of the processor; and
changing the first weighting factor to a third weighting factor based on a change in the monitored parameter.

10. A device for use with a processor operating at a clock cycle, the processor being operable to simultaneously process multiple instructions via at least one thread during a clock cycle, said device comprising:
a first portion operable to determine an initial usage for each thread of the at least one thread, each corresponding thread of the at least one thread being in one of a run state wherein the thread therein is executing non-idle code and is using a first amount of processor usage, an idle state wherein the thread therein is executing idle code and is using a second amount of processor usage that is lower than the first amount of processor usage, or a nap state wherein the thread therein is suspended and is using a third amount of processor usage that is lower than the second amount of processor, each instruction on a corresponding thread of the at least one thread additionally being in one of a dispatch state using a fourth amount of processor usage or a non-dispatch state using a fifth amount of processor usage that is lower than the fourth amount of processor usage;
a second portion operable to determine whether each thread of the at least one thread is in a run state or an idle state;
a third portion operable to multiply a first weighting factor to the initial usage for each thread determined to be in a run state to generate corresponding fractional run state portions of usage;
a fourth portion operable to multiply a second weighting factor to the initial usage for each thread determined to be in an idle state to generate corresponding fractional idle state portions of usage;
a fifth portion operable to determine whether each thread in a run state is in a dispatch state or a non-dispatch state;
a sixth portion operable to multiply a third weighting factor to the initial usage for each thread determined to be in a dispatch state to generate corresponding fractional dispatch state portions of usage; and
and a seventh portion operable to multiply a fourth weighting factor to the initial usage for each thread determined to be in a non-dispatch state to generate corresponding fractional non-dispatch state portions of usage.

11. The device of claim 10, further comprising:
an eighth portion operable to determine the number of the at least one thread not in a nap state,
wherein said third portion is further operable to multiply the first weighting factor to the initial usage for each thread determined to be in a run state to generate corresponding fractional run state portions of usage based on the determined number of the at least one thread not in a nap state, and
wherein said fourth portion is further operable to multiply the second weighting factor to the initial usage for each thread determined to be in an idle state to generate corresponding fractional idle state portions of usage based on the determined number of the at least one thread not in a nap state.

12. The device of claim 11, further comprising:
a ninth portion operable to determine the number of the least one thread in a non-dispatch state; and
a tenth portion operable to determine the first weighting factor based on the determined number of the at least one thread in a non-dispatch state.

13. The device of claim 10, further comprising:
an eighth portion operable to determine the number of the least one thread in a non-dispatch state; and
a ninth portion operable to determine the first weighting factor based on the determined number of the at least one thread in a non-dispatch state.

14. The device of claim 10, further comprising:
an eighth portion operable to determine the number of the at least one thread in a nap state,
wherein said third portion is further operable to multiply the first weighting factor to the initial usage for each thread determined to be in a run state to generate corresponding fractional run state portions of usage based on the determined number of the at least one thread in a nap state, and
wherein said fourth portion is further operable to multiply the second weighting factor to the initial usage for each thread determined to be in an idle state to generate corresponding fractional idle state portions of usage based on the determined number of the at least one thread in a nap state.

15. The device of claim 10, further comprising:
a fifth portion operable to determine the number of the at least one thread not in a nap state,
wherein said third portion is further operable to multiply the first weighting factor to the initial usage for each thread determined to be in a run state to generate corresponding fractional run state portions of usage based on the determined the number of the at least one thread not in a nap state, and
wherein said fourth portion is further operable to multiply the second weighting factor to the initial usage for each thread determined to be in an idle state to generate corresponding fractional idle state portions of usage based on the determined number of the at least one thread not in a nap state.

16. The device of claim 15, further comprising:
a sixth portion operable to determine the number of the least one thread in a non-dispatch state; and
a seventh portion operable to determine the first weighting factor based on the determined number of the at least one thread in a non-dispatch state.

17. The device of claim 10,
wherein said third portion is further operable to multiply the first weighting factor to the initial usage for each thread determined to be in a run state to generate corresponding fractional run state portions of usage based on the total number of the at least one thread, and
wherein said fourth portion is further operable to multiply the second weighting factor to the initial usage for each thread determined to be in an idle state to generate corresponding fractional idle state portions of usage based on the total number of the at least one thread.

18. The device of claim 10, further comprising:
a fifth portion operable to monitor a parameter of the processor core; and
sixth portion operable to change the first weighting factor to a third weighting factor based on a change in the monitored parameter.

* * * * *